United States Patent
Song et al.

(10) Patent No.: US 10,177,668 B2
(45) Date of Patent: Jan. 8, 2019

(54) CONVERTER AND CONTROL METHOD THEREOF

(71) Applicant: DELTA ELECTRONICS, INC., Taoyuan (TW)

(72) Inventors: Hai-Bin Song, Taoyuan (TW); Dao-Fei Xu, Taoyuan (TW); Jian Zhou, Taoyuan (TW); Le-Yang Yang, Taoyuan (TW); Qi Fu, Taoyuan (TW); Jin-Fa Zhang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/677,007

(22) Filed: Aug. 14, 2017

(65) Prior Publication Data

US 2018/0062529 A1    Mar. 1, 2018

(30) Foreign Application Priority Data

Aug. 31, 2016  (CN) .......................... 2016 1 0790921

(51) Int. Cl.
*H02M 3/33*  (2006.01)
*H02M 3/335*  (2006.01)
*H02M 1/34*  (2007.01)

(52) U.S. Cl.
CPC ... *H02M 3/33569* (2013.01); *H02M 3/33507* (2013.01); *H02M 2001/342* (2013.01)

(58) Field of Classification Search
CPC . H02M 2007/4815; H02M 2007/4818; H02M 3/33507; H02M 3/33561; H02M 3/33569; H02M 3/33515; H02M 3/33523; Y02B 70/1491

USPC .......................... 363/20–21.03, 21.12–21.18
See application file for complete search history.

(56) References Cited

U.S. PATENT DOCUMENTS

| 5,943,200 | A  |   | 8/1999  | He  |              |
|-----------|----|---|---------|-----|--------------|
| 7,633,777 | B2 | * | 12/2009 | Lin | H02M 3/33592 |
|           |    |   |         |     | 363/21.08    |
| 8,693,223 | B2 | * | 4/2014  | Lin | H02M 3/33507 |
|           |    |   |         |     | 363/21.03    |

(Continued)

FOREIGN PATENT DOCUMENTS

| CN | 101572490 A | 11/2009 |
| CN | 104300795 A |  1/2015 |
| CN | 104485831 A |  4/2015 |

(Continued)

*Primary Examiner* — Nguyen Tran
(74) *Attorney, Agent, or Firm* — CKC & Partners Co., Ltd.

(57) ABSTRACT

A converter includes a transformer, a main switch, an active clamp circuit, and a control circuit. The transformer includes a primary winding and a secondary winding, and is configured to receive an input voltage and output an output voltage to a load. The main switch is coupled between the primary winding and a primary ground terminal. The active clamp circuit includes an auxiliary switch and a clamp capacitor. The auxiliary switch is coupled to the clamp capacitor in series, and the active clamp circuit is coupled in parallel to the two terminals of the primary winding or the main switch, and is configured to clamp the voltage across the main switch when it is OFF. The control circuit outputs an auxiliary switch control signal to turn on the auxiliary switch when the voltage across the main switch is at its first peak of the resonant voltage.

16 Claims, 6 Drawing Sheets

(56) References Cited

U.S. PATENT DOCUMENTS

2010/0067259 A1    3/2010  Liu
2015/0016153 A1*   1/2015  Orr .................. H02M 3/33538
                                                      363/21.04

FOREIGN PATENT DOCUMENTS

TW      200828745 A     7/2008
TW      201014140 A     4/2010
TW      201543798 A    11/2015

* cited by examiner

CONVERTER AND CONTROL METHOD THEREOF

RELATED APPLICATIONS

This application claims priority to China Application Serial Number 201610790921.1, filed Aug. 31, 2016, which is herein incorporated by reference.

BACKGROUND

Technical Field

The present disclosure relates to a converter, and in particular, to a Flyback converter.

Description of Related Art

Flyback converters are widely applied in low power applications, especially in power devices lower than 100 W, due to characteristics of a simple circuit structure, electrical isolation between the input and output stage, and low cost.

With the widespread use of switching power supplies in portable devices such as notebooks, tablets, and smartphones in recent years, there is a trend to develop switching power supplies with smaller sizes, higher efficiency and higher frequency.

However, the leakage loss of the transformer and the turn-on loss of the main switch limit the development of the Flyback converter with smaller sizes and a higher frequency.

SUMMARY

One aspect of the present disclosure is a converter including a transformer, a main switch, an active clamp circuit and a control circuit. The transformer includes a primary winding and a secondary winding, and is configured to receive an input voltage and output an output voltage to a load. The main switch is electrically coupled between the primary winding and a primary ground terminal. The active clamp circuit includes an auxiliary switch and a clamp capacitor, in which the auxiliary switch is coupled to the clamp capacitor in series, and the active clamp circuit is coupled in parallel to the two terminals of the primary winding or the two terminals of the main switch, and is configured to clamp the voltage across the main switch when the main switch is off. The control circuit is configured to output an auxiliary switch control signal to control the auxiliary switch to be turned on when the voltage across the main switch is at one of the 1st to Nth peaks of the resonant voltage, in which N is an integer. Another aspect of the present disclosure is a control method for a converter. The control method includes: receiving, by a control circuit, a detecting signal; calculating, by the control circuit, a period of time in which a secondary current drops from maximum to zero according to the detecting signal, to determine the moment of the first peak of the resonant voltage of the voltage across a main switch; and outputting, by the control circuit, an auxiliary switch control signal to control an auxiliary switch to be turned on when the voltage across the main switch is at one of the 1st to Nth peaks of the resonant voltage, in which N is an integer.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
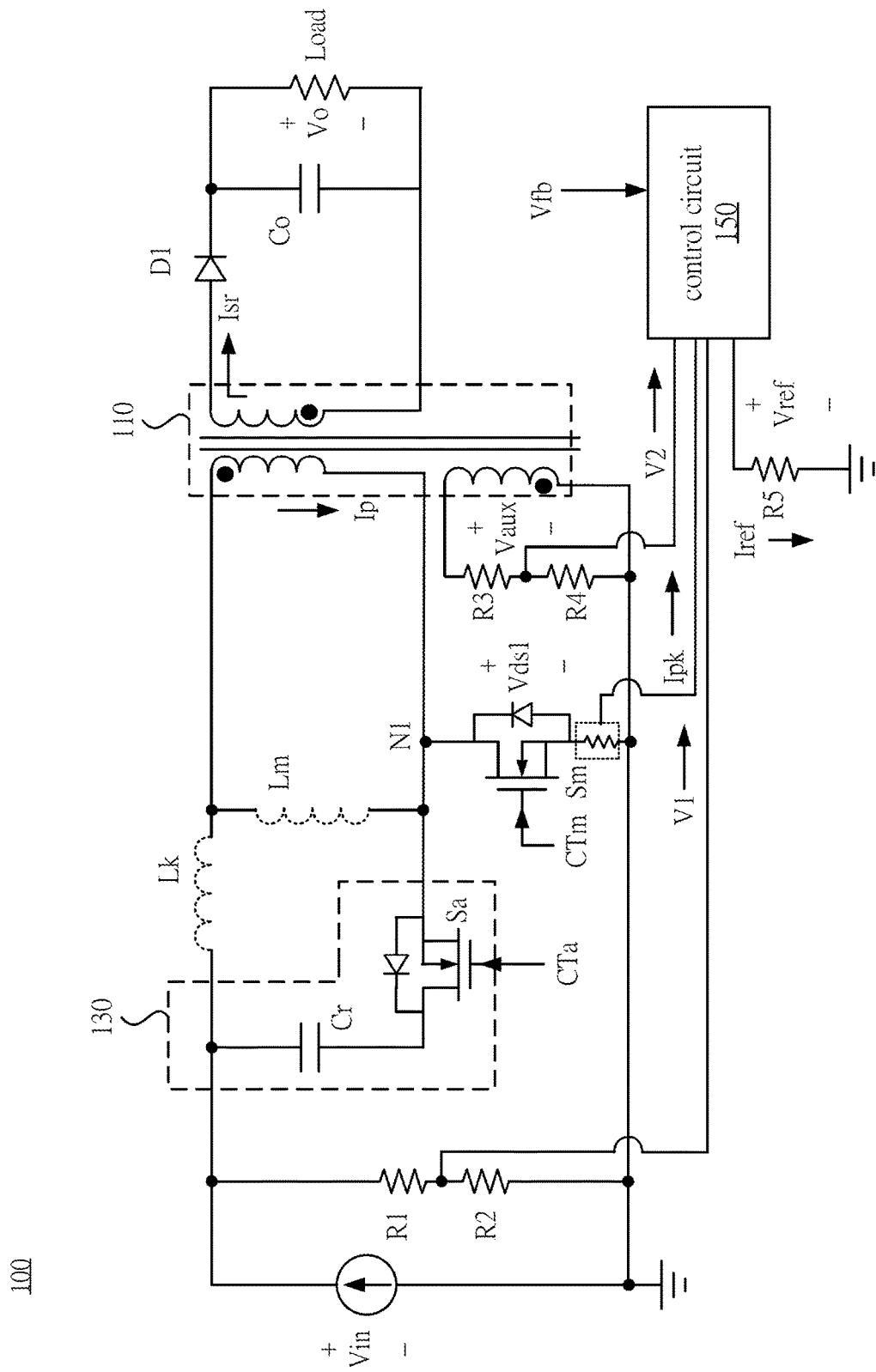
FIG. 1 is a diagram illustrating a converter according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or similar parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "include" and "comprise" are used in an open-ended fashion, and thus should be interpreted to mean "include, but not limited to." As used herein, the term "and/or" includes any and all combinations of one or more of the associated listed items. In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Reference is made to FIG. 1. FIG. 1 is a diagram illustrating a converter 100 according to some embodiments of the present disclosure. As shown in FIG. 1, the converter 100 is configured to convert an input voltage Vin from an input voltage source to an output voltage Vo. In some embodiments, the converter 100 may be a Flyback Converter. Specifically, in some embodiments, the converter 100 is an active clamp Flyback converter.

As shown in FIG. 1, in some embodiments, the converter 100 includes a transformer 110, an active clamp circuit 130, a control circuit 150, a main switch Sm, a secondary rectifier unit D1 and an output capacitor Co.

As shown in FIG. 1, the transformer 110 includes a primary winding, a secondary winding, and an auxiliary winding. A first terminal of the primary winding is electrically coupled to a positive terminal of the input voltage Vin, a second terminal of the primary winding is electrically coupled to a primary ground (i.e., the negative terminal of the input voltage Vin) through the main switch Sm. A first terminal of the secondary winding is electrically coupled to a first terminal of the output capacitor Co through the secondary rectifier unit D1, and a second terminal of the secondary winding is electrically coupled to a second terminal of the output capacitor Co.

It is noted that, in some other embodiments, the secondary rectifier unit D1 may also be arranged between the second terminal of the secondary winding and the second terminal of the output capacitor Co. In addition, in some embodiments, the secondary rectifier unit D1 may be implemented by a rectifier diode as illustrated in FIG. 1. In some other embodiments, the secondary rectifier unit D1 may also be implemented by various transistors which act as synchronous rectifier switches. Therefore, the circuit shown in FIG. 1 is merely one example of various embodiments of the present disclosure and not meant to limit the present disclosure.

As shown in FIG. 1, the transformer 110 is configured to transmit the power from the primary winding to the secondary winding, and operates with circuit elements such as the main switch Sm, the secondary rectifier unit D1, etc. to convert the input voltage Vin to the output voltage Vo.

In some embodiments, the main switch Sm is electrically coupled to the primary winding of the transformer 110 at the node N1. Specifically, in some embodiments, a first terminal of the main switch Sm is electrically coupled to the second terminal of the primary winding of the transformer 110. A second terminal of the main switch Sm is electrically coupled to a negative terminal of the input voltage Vin. Alternatively stated, the main switch Sm is electrically coupled between the primary winding and the primary ground terminal. A control terminal of the main switch Sm is configured to receive a main switch control signal CTm and configured to turn on or turn off the main switch Sm selectively. For example, in some embodiments, when the main switch control signal Ctm has a first level (e.g., a high level), the main switch Sm is on. On the other hand, when the main switch control signal Ctm has a second level (e.g., a low level), the main switch Sm is off.

Specifically, when the main switch Sm is on, a primary current Ip flowing through the primary winding is gradually increased in the transformer 110, and power is stored in the transformer 110 correspondingly. At this time, the primary winding and the secondary winding of the transformer 110 have opposite dotted terminal, the secondary rectifier unit D1 is off, no power is transmitted from the primary winding to the secondary winding, and the output voltage Vo is maintained by the output capacitor Co. Alternatively stated, the output capacitor Co is electrically coupled to the secondary winding and the secondary rectifier unit D1, and configured to provide the power output to the load when the secondary rectifier unit D1 is off.

On the other hand, when the main switch Sm is off, the secondary rectifier unit D1 is on such that the magnetizing current is transmitted from the primary winding to the secondary winding. With a current Isr flowing through the secondary rectifier unit D1, the power stored in the transformer 110 is transmitted through the turned-on secondary rectifier unit D1 to the load and the output capacitor Co. This period is the main turn-on period of the secondary rectifier unit D1.

The active clamp circuit 130 is configured to clamp the voltage Vds1 across the main switch Sm when the main switch Sm is off. In some embodiments, the active clamp circuit 130 is electrically coupled to the positive terminal of the input voltage Vin and the node N1.

Specifically, the active clamp circuit 130 may include an auxiliary switch Sa and a clamp capacitor Cr, and the auxiliary switch Sa is coupled to the clamp capacitor Cr in series. In some embodiments, a first terminal of the auxiliary switch Sa is electrically coupled to the main switch Sm at the node N1. A first terminal of the clamp capacitor Cr is electrically coupled to the positive terminal of the input voltage Vin and the primary winding. A second terminal of the clamp capacitor Cr is electrically coupled to a second terminal of the auxiliary switch Sa. Alternatively stated, the active clamp circuit 130 is coupled in parallel to the two terminals of the primary winding. The control terminal of the auxiliary switch Sa is configured to receive an auxiliary switch control signal CTa. When the auxiliary switch Sa is on, the clamp capacitor Cr is electrically connected in parallel to the two terminals of the primary winding. Therefore, when the main switch is off, the voltage between the node N1 and the positive terminal of the input voltage Vin is clamped by the clamp capacitor.

It is noted that, in some other embodiments, the active clamp circuit 130 may also be coupled in parallel to the two terminals of the main switch Sm, and configured to clamp the voltage across the main switch Sm when the main switch Sm is off. Alternatively stated, the active clamp circuit 130 may be coupled in parallel to the two terminals of the primary winding or the main switch Sm. In addition, in various embodiments, the auxiliary switch Sa and the clamp capacitor Cr may also exchange positions with each other.

For example, in some embodiments, the first terminal of the clamp capacitor Cr is electrically coupled to the main switch Sm at the node N1. The first terminal of the auxiliary switch Sa is electrically coupled to the positive terminal of the input voltage Vin and the primary winding. The second terminal of the clamp capacitor Cr is electrically coupled to the second terminal of the auxiliary switch Sa. The control terminal of the auxiliary switch Sa is configured to receive the auxiliary switch control signal CTa. The circuit shown in FIG. 1 is merely one example of various embodiments of the present disclosure and not meant to limit the present disclosure.

Accordingly, when the auxiliary switch Sa is controlled to be turned on by the auxiliary switch control signal CTa, the voltage of the two terminals of the magnetizing inductance Lm and the leakage inductance Lk present in the converter 100 is clamped to the voltage of the clamp capacitor Cr. At this time, the secondary rectifier unit D1 conducts again. The current Isr flows through the secondary rectifier unit D1 again. Thus, the power in the leakage inductance Lk is recycled and re-used, and transmitted to the load and the output capacitor Co. This period is the sub turn-on period of the secondary rectifier unit D1.

Figure 2:
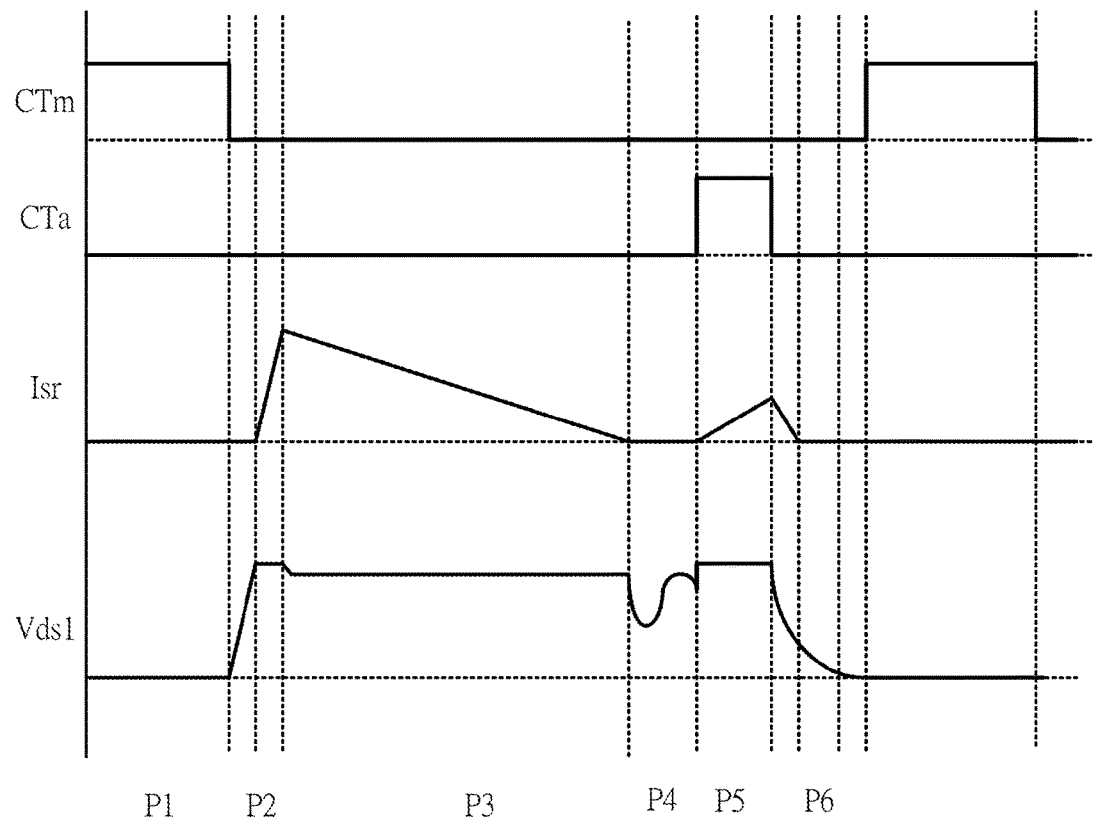
FIG. 2 is a waveform diagram illustrating voltage and current signals of the converter according to some embodiments of the present disclosure.

To further explain the specific operation of the converter 100, reference is made to FIG. 2. FIG. 2 is a waveform diagram illustrating the voltage and current signals of the converter 100 according to some embodiments of the present disclosure. In FIG. 2, similar elements related to the embodiment of FIG. 1 are assigned with the same reference numerals for better understanding. For better understanding of the present disclosure, the voltage and current signals of the converter 100 shown in FIG. 2 are discussed in relation to the embodiment shown in FIG. 1, but are not limited thereto.

As shown in FIG. 2, in some embodiments, a switching cycle includes periods P1-P6. During the period P1, the main switch control signal Ctm is at the high level, and the main switch Sm is on, thus the voltage Vds1 across the two terminals (i.e., the source terminal and the drain terminal of Sm) is about zero. At this time, the secondary rectifier unit D1 is off, and the current Isr is zero.

Next, during the period P2, the main switch control signal CTm is switched from the high level to the low level, and the main switch Sm is turned off correspondingly, and the two terminals (i.e., the source terminal and the drain terminal) of the main switch Sm start to withstand the voltage, and the voltage Vds1 is switched from the low level to the high level. In this period, the secondary rectifier unit D1 is on and the current Isr is raised to the positive value quickly. The leakage energy is absorbed by the clamp capacitor Cr.

Next, during the period P3, as the power stored in the transformer 110 is transmitted to the load, and the current Isr gradually falls from maximum to zero.

Next, during the period P4, the main switch control signal CTm and the auxiliary switch control signal CTa are both at the low level, and the current Isr is zero at this time. Since the parasitic capacitor of the main switch Sm and the magnetizing inductance cause oscillation, the cross voltage Vds1 oscillates correspondingly.

Next, during the period P5, the main switch control signal CTm is maintained at the low level, and the auxiliary switch control signal CTa is switched from the low level to the high level correspondingly, which turns on the auxiliary switch Sa and the active clamp circuit 130 clamps the cross voltage of the main switch Sm. Alternatively stated, the active clamp circuit 130 clamps the cross voltage Vds1 at the high level according to the voltage value of the clamp capacitor Cr and the input voltage Vin. The secondary rectifier unit D1 is turned on and the current Isr is positive.

Next, during the period P6, the auxiliary switch control signal CTa is switched from the high level to the low level, which turns off the auxiliary switch Sa correspondingly, and the cross voltage Vds1 gradually falls from the high level to zero. Alternatively stated, the control circuit 150 is further configured to control the auxiliary switch Sa to be off before the secondary current Isr decreases to zero.

The operation of the above periods P1-P6 are repeated, and thus the converter 100 may be controlled to convert the input voltage Vin to the output voltage Vo by controlling the on and off of the main switch Sm and the auxiliary switch Sa.

As shown in the voltage waveform of FIG. 2, during the period P4 the cross voltage Vds1 oscillates correspondingly. If the auxiliary switch Sa is not turned on at the peak of the resonant voltage of the voltage (i.e., the cross voltage Vds1) across the main switch Sm, the turn-on of the auxiliary switch Sa is hard switching, which causes the higher loss of the switch and serious electromagnetic interference.

Alternatively stated, in order to reduce the turn-on loss of the auxiliary switch Sa, the auxiliary switch Sa should be turned on under a soft switching condition, in some embodiments, the converter 100 is configured to detect the first peak of the resonant voltage of the voltage (i.e., the cross voltage Vds1) across the main switch Sm to represent the moment that the auxiliary switch Sa is turned on.

In addition, in some embodiments, the converter 100 may further be configured to determine at which one of the peaks of the resonant voltage of the cross voltage Vds1 that the auxiliary switch Sa is turned on according to the load condition, so as to increase the conversion efficiency of the converter 100 in a manner that coordinates with the load condition. For example, in some embodiments, the control circuit 150 is further configured to receive a feedback voltage signal Vfb and determine the load condition of the converter 100 accordingly.

When the converter 100 is at a heavy load condition, the control circuit 150 of the converter 100 controls the auxiliary switch Sa to be turned on when the voltage Vds1 across the main switch Sm is at the first peak of the resonant voltage. On the other hand, when the load of the converter 100 is reduced, that is, when the converter 100 is at a medium load condition, the control circuit 150 controls the auxiliary switch Sa to be turned on when the voltage Vds1 across the main switch Sm is at one of the 2nd to Nth peaks of the resonant voltage, in which N is an integer. In addition, in some embodiments, when the converter 100 is at a light load condition, the control circuit 150 outputs the auxiliary switch control signal CTa to control the converter 100 to be operated in the fixed frequency mode (FF mode) or the voltage control oscillating mode (VCO mode) or the burst mode.

Figure 3:
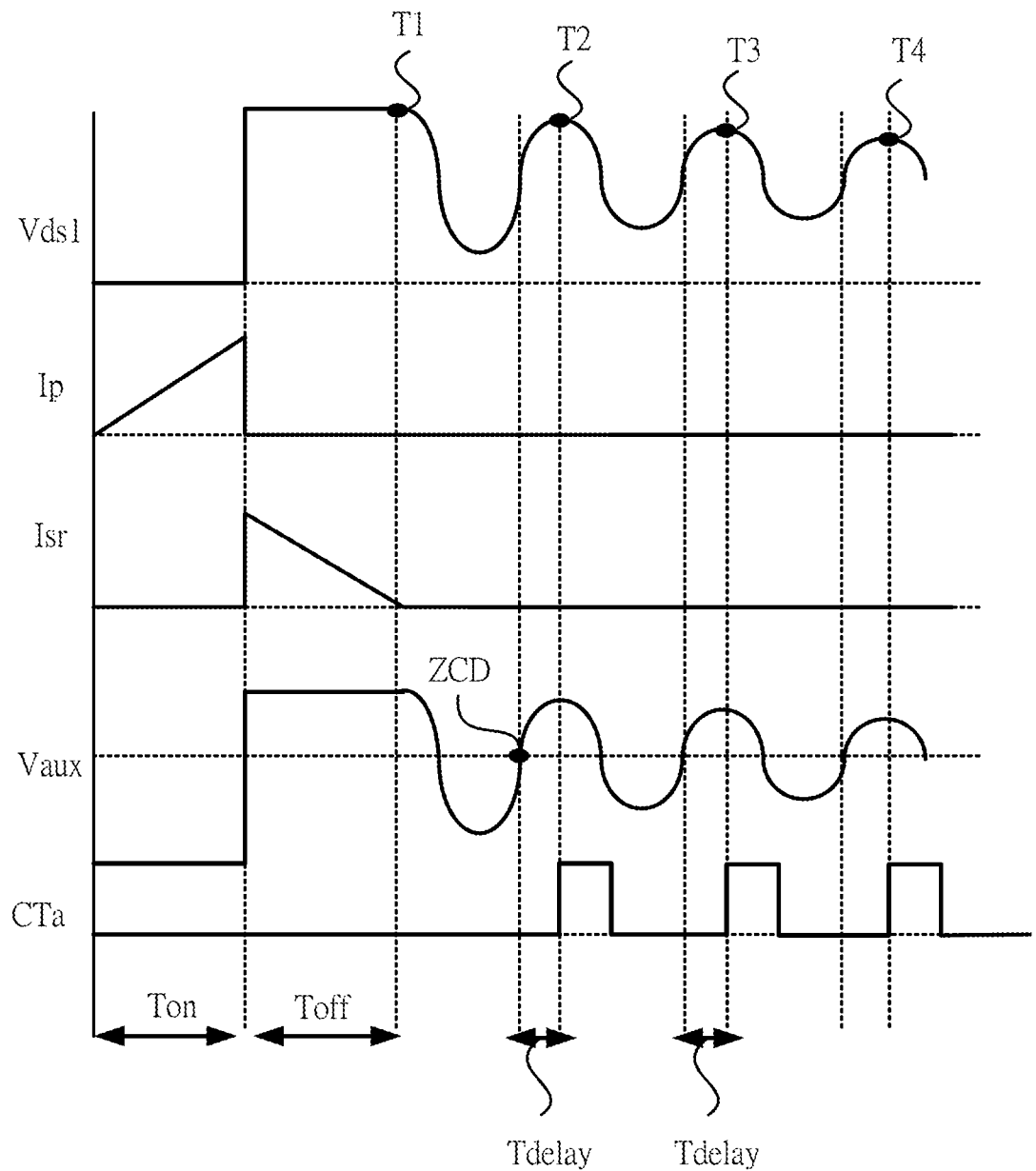
FIG. 3 is a waveform diagram illustrating voltage and current signals of the converter according to some embodiments of the present disclosure.

Reference is made to FIG. 3. FIG. 3 is a waveform diagram illustrating the voltage and current signals of the converter 100 according to some embodiments of the present disclosure. In FIG. 3, similar elements related to the embodiment of FIG. 1 and FIG. 2 are assigned with the same reference numerals for better understanding. For better understanding of the present disclosure, the voltage and current signal of the converter 100 shown in FIG. 3 are discussed in relation to the embodiment shown in FIG. 1 and FIG. 2, but is not limited thereto.

As shown in FIG. 3, T1 denotes the moment when the resonant voltage is at the first peak, T2 denotes the moment when the resonant voltage is at the second peak, and T3 denotes the moment when the resonant voltage is at the third peak. The moment T1 corresponds to the time in which the secondary current Isr flowing through the secondary winding and the secondary rectifier unit D1 reaches zero. According to electronic circuit theory and the volt-second balance rule, the time period Toff in which the secondary current Isr drops from maximum to zero may be calculated using the following formula:

$$Toff = (1/(n*k))*(Vin/Vaux\_1)*Ton$$

wherein n denotes the turn ratio between the primary winding and the secondary winding of the transformer 110, k denotes the turn ratio between the secondary winding and the auxiliary winding of the transformer, Vin denotes the value of the input voltage Vin, Vaux_1 denotes the voltage value of the auxiliary winding during the time period Toff, and Ton denotes the conducting time of the main switch Sm. One of ordinary skill in the art can readily understand how to derive the above formula by the volt-second balance rule and further explanation is omitted for the sake of brevity.

The time period Toff can also be calculated according to the input voltage of the converter, the output voltage of the converter and Ton.

In addition, in some embodiments, the formula above may be re-written and the time period Toff (i.e., the time length of the time period P3 in FIG. 2) in which the secondary current Isr drops from maximum to zero may also be calculated based on the following formula:

$$Toff = Lm * Ipk / (n * k * Vaux\_1)$$

wherein Lm denotes the magnetizing inductance present in the converter 100, Ipk denotes the peak value of the primary current, n denotes the turn ratio between the primary winding and the secondary winding of the transformer 110, k denotes the turn ratio between the secondary winding and the auxiliary winding of the transformer, Vaux_1 denotes the voltage value of the auxiliary winding during the time period Toff, and Ton denotes the conducting time of the main switch Sm. One skilled in the art can understand how to derive the above formula by the operation of the converter 100 and further explanation is omitted for the sake of brevity.

Specifically, the turn ratio n between the primary winding and the secondary winding of the transformer 110, the turn ratio k between the secondary winding and the auxiliary winding of the transformer, and the magnetizing inductance Lm are determined by the design of the transformer 110. Thus, with respect to the design of the completed transformer 110, the value of 1/(n*k) and the magnetizing inductance Lm are known values.

In addition, the input voltage Vin and the voltage value Vaux_1 of the auxiliary winding during the time period Toff may be detected by corresponding voltage detecting units, and thus the ratio value of the input voltage Vin and the voltage value Vaux_1 of the auxiliary winding during the time period Toff may be figured out. The peak value Ipk of the primary current may be detected by a corresponding current detecting unit. The conducting time Ton of the main switch Sm may be detected by a chip inside the converter 100.

Thus, the converter 100 may calculate the time period Toff in which the secondary current Isr drops from maximum to zero based on the two formulas above, and output the auxiliary switch control signal CTa according to the time period Toff, so as to control the auxiliary switch Sa to be turned on when the voltage Vds1 across the main switch Sm is at the first peak of the resonant voltage when the converter 100 is at a heavy load, and thus achieve the soft switching of the auxiliary switch Sa to improve the efficiency of the converter 100.

As shown in FIG. 3, the auxiliary winding voltage Vaux corresponds to the voltage Vds1 across the main switch Sm. The control circuit 150 may detect negative-to-positive zero crossing points of the voltage Vaux across the auxiliary winding, calculate the moment of the peaks of the resonant voltage T2, T3, T4, etc. of the voltage Vds1 across the main switch Sm accordingly, and output the auxiliary switch control signal CTa correspondingly, to control the auxiliary switch Sa to be turned on when the voltage Vds1 across the main switch Sm is at one of the 2nd to Nth peaks of the resonant voltage, in which N is an integer.

Specifically, the control circuit 150 may execute a voltage zero-crossing detection with respect to the auxiliary winding voltage Vaux in order to obtain the time of the zero crossing points ZCD. In some embodiments, the control circuit 150 may execute counting every time the waveform of the oscillation is switched from a negative to positive value passing through the zero crossing points ZCD. When the counted value is equal to the configured number of the peaks, the control circuit 150 may output the auxiliary switch control signal CTa to turn on the auxiliary switch Sa after delaying for a delay duration Tdelay. Since the delay duration Tdelay is configured to delay the phase angle of 90 degrees, the auxiliary switch control signal CTa turns on when the voltage Vds1 across the main switch Sm is at the peaks of the resonant voltage, so as to control the auxiliary switch Sa to be turned on when the voltage Vds1 across the main switch Sm is at the 2nd to Nth peaks of the resonant voltage, and thus achieve the soft switching of the auxiliary switch Sa to improve the efficiency of the converter 100.

In order to discuss the specific operation of the control circuit 150 in detail, reference is made to FIG. 1 again. As shown in FIG. 1, the converter 100 further includes resistors R1-R5, in which the resistors R1 and R2 are coupled to each other in series, and coupled across the input voltage Vin in parallel. Specifically, the first terminal of the resistor R1 is electrically coupled to the positive terminal of the input voltage Vin, and the second terminal of the resistor R1 is electrically coupled to the first terminal of the resistor R2. The second terminal of the resistor R2 is electrically coupled to the negative terminal of the input voltage Vin. Therefore, the resistor R1 and the resistor R2 may divide the input voltage Vin, so as to output a voltage V1 to the control circuit 150.

As shown in FIG. 1, the resistor R3 and resistor R4 are coupled to each other in series, and coupled across the auxiliary winding in parallel. Specifically, the first terminal of the resistor R3 is electrically coupled to the first terminal of the auxiliary winding, and the second terminal of the resistor R3 is electrically coupled to the first terminal of the resistor R4. The second terminal of the resistor R4 is electrically coupled to the second terminal of the auxiliary winding and the second terminal of the resistor R2. The second terminal of the auxiliary winding is electrically coupled to the negative terminal of the input voltage Vin. The first terminal of the primary winding, the second terminal of the secondary winding, and the second terminal of the auxiliary winding are the dotted terminals. Thus, the resistor R3 and the resistor R4 may divide the cross voltage of the auxiliary winding so as to output the voltage V2 to the control circuit 150.

Since the input voltage Vin and the voltage value Vaux_1 of the auxiliary winding during the time period Toff are both at high levels, by voltage division performed by the resistors R1, R2 and the resistors R3, R4 respectively, proper voltage levels may be provided for the control circuit 150 for the detection. Specifically, the voltage V1 is obtained by Vin*R2/(R1+R2), and the voltage V2 is obtained by Vaux_1*R4/(R3+R4). Therefore, by a suitable resistor value arrangement, the ratio of the resistors R1 and R2 is equal to the ratio of the resistors R3 and R4 (i.e. R1/R2=R3/R4), and the ratio of the input voltage Vin and the voltage value Vaux_1 of the auxiliary winding during the time period Toff may be calculated by the ratio of the voltage V1 and V2. (i.e., V1/V2=Vin/Vaux_1)

In addition, as stated in the above paragraph, when the design of the transformer 110 is completed, the parameter 1/(n*k) is a fixed constant. Thus, the control circuit 150 may use an externally connected High-Precision resistor R5, and by controlling a reference current Iref of a constant current source in the control circuit 150 flowing through the resistor R5, obtain a constant voltage Vref to indicate the parameter 1/(n*k).

In addition, the control circuit 150 may measure a timing start from the turn-on moment of the main switch Sm in each cycle, which is a very short delay after the moment in which the auxiliary switch Sa turns off in the previous cycle, until the primary current Ip flowing through the primary winding reaches the peak value, and the corresponding voltage value reaches the feedback voltage, in order to calculate the conducting time Ton of the main switch Sm at the primary side.

Therefore, after the control circuit 150 obtains the conducting time Ton of the main switch Sm, the parameter $1/(n*k)$, the input voltage Vin and the voltage value Vaux_1 of the auxiliary winding during the time period Toff, the control circuit 150 may figure out the time period Toff, and calculate the moment which the voltage Vds1 across the main switch Sm is at the first peak of the resonant voltage according to the above values. In addition, in some embodiments, the control circuit 150 may also fine tune the resistor value such that the auxiliary switch Sa is turned on precisely at the first peak of the resonant voltage of the cross voltage Vds1.

Since the value of the voltage V2 is Vaux_1*R4/(R3+R4), the control circuit 150 may also execute voltage zero-crossing detection with respect to the voltage V2 in order to detect the second peak of the resonant voltage, the third peak of the resonant voltage, and so on to the Nth peak of the resonant voltage, and turn on the auxiliary switch at one of the voltage peaks to achieve the soft-switching.

Figures 4A, 4B:
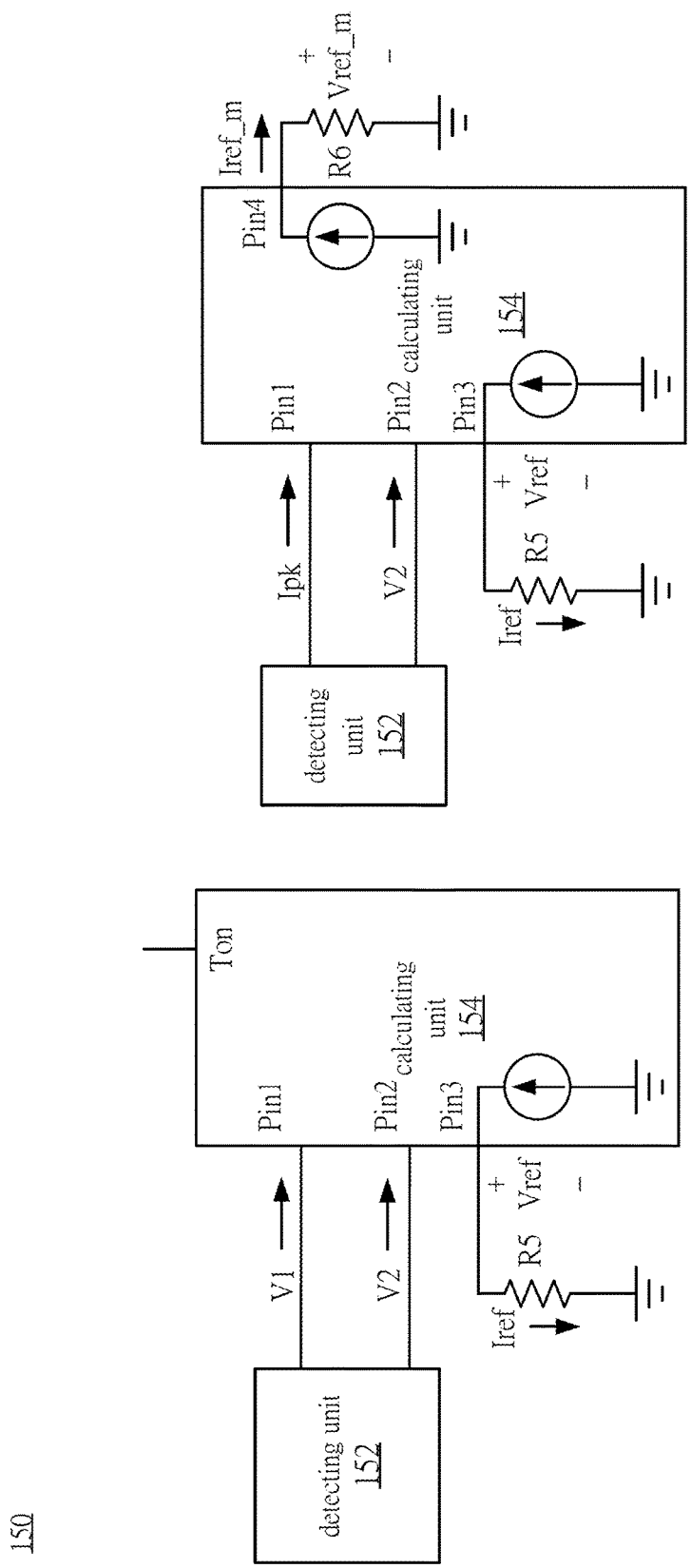
FIG. 4A is a diagram illustrating a control circuit of the converter according to some embodiments of the present disclosure.
FIG. 4B is a diagram illustrating the control circuit of the converter according to some embodiments of the present disclosure.

Reference is made to FIG. 4A. FIG. 4A is a diagram illustrating the control circuit 150 according to some embodiments of the present disclosure. As shown in FIG. 4A, in some embodiments, the control circuit 150 includes a calculating unit 154. The detecting unit 152 of the converter 100 is configured to detect the voltage signal and/or the current signal of the converter 100 to obtain the detecting signal. The calculating unit 154 receives the detecting signal and calculates the time period Toff in which the secondary current Isr drops from maximum to zero according to the detecting signal.

As stated in the above paragraph, in some embodiments, the detecting signal includes the voltage V1 corresponding to the input voltage Vin and the voltage V2 corresponding the voltage value Vaux_1 of the auxiliary winding during the time period Toff. The calculating unit 154, according to the turn ratio n between the primary winding and the secondary winding of the transformer 110, the turn ratio k between the secondary winding and the auxiliary winding of the transformer 110, the ratio Vin/Vaux_1 of the input voltage Vin and the voltage value Vaux_1 of the auxiliary winding during the time period Toff, and the conducting time Ton of the main switch Sm, calculates the time period time Toff in which the secondary current Isr drops from maximum to zero, and outputs the auxiliary switch control signal CTa according to the time period time Toff, so as to control the auxiliary switch Sa to be turned on at the moment of delaying the time period Toff in which the secondary current Isr drops from maximum to zero after the main switch Sm being turned off, i.e., at the moment that the voltage Vds1 across the main switch Sm is at the first peak of the resonant voltage.

Specifically, in some embodiments, the calculating unit 154 includes a first pin Pin1 configured to receive the voltage (i.e., voltage V1) corresponding to the input voltage signal output by the detecting unit 152, a second pin Pin2 configured to receive the voltage (i.e., voltage V2) corresponding to the voltage value Vaux_1 of the auxiliary winding during the time period Toff output by the detecting unit 152, and a third pin Pin3 connected to the resistor R5 and the first current source, and configured to obtain a voltage Vref by the first current source providing a current Iref flowing through the resistor R5, in order to indicate the parameter $1/(n*k)$.

Therefore, the calculating unit 154 may calculate the time period Toff in which the secondary current Isr drops from maximum to zero according to the value of Pin1, Pin2, Pin3 and the conducting time Ton of the main switch Sm recorded internally.

Reference is made to FIG. 4B. FIG. 4B is a diagram illustrating the control circuit 150 according to some embodiments of the present disclosure. As shown in FIG. 4B, in some embodiments, the detecting signal includes the peak value Ipk of the primary current and the voltage value Vaux_1 of the auxiliary winding during the time period Toff. The calculating unit 154, according to the turn ratio n between the primary winding and the secondary winding of the transformer 110, the turn ratio k between the secondary winding and the auxiliary winding of the transformer 110, the peak value Ipk of the primary current, the auxiliary winding voltage Vaux, and the magnetizing inductance Lm, calculates the time period Toff in which the secondary current Isr drops from maximum to zero, and outputs the auxiliary switch control signal CTa according to the time period Toff, so as to control the auxiliary switch Sa to be turned on at the moment of delaying the time period Toff in which the secondary current Isr drops from maximum to zero after the main switch Sm being turned off, i.e., at the moment that the voltage Vds1 across the main switch Sm is at the first peak of the resonant voltage.

Specifically, as shown in FIG. 4B, in some embodiments, the calculating unit 154 includes a first pin Pin1 configured to receive the peak value Ipk of the primary current, a second pin Pin2 configured to receive the voltage (i.e., voltage V2) corresponding to the voltage value Vaux_1 of the auxiliary winding during the time period Toff output by the detecting unit 152, a third pin Pin3 connected to the resistor R5 and the first current source, and configured to obtain a constant voltage Vref by the first current source providing a current Iref flowing through the resistor R5, in order to indicate the parameter $1/(n*k)$, and a fourth pin Pin4 connected to the resistor R6 and the second current source, and configured to obtain a constant voltage Vref_m by the second current source providing a current Iref_m flowing through the resistor R6, in order to indicate the parameter Lm.

Therefore, the calculating unit 154 may calculate the time period Toff in which the secondary current Isr drops from maximum to zero according to the value of Pin1, Pin2, Pin3 and Pin4.

It is noted that the detecting unit 152 in the above embodiments is not limited to the specific examples illustrated in FIG. 1. In addition, the calculating unit 154 may also be varied according to actual design requirements.

Figure 5:
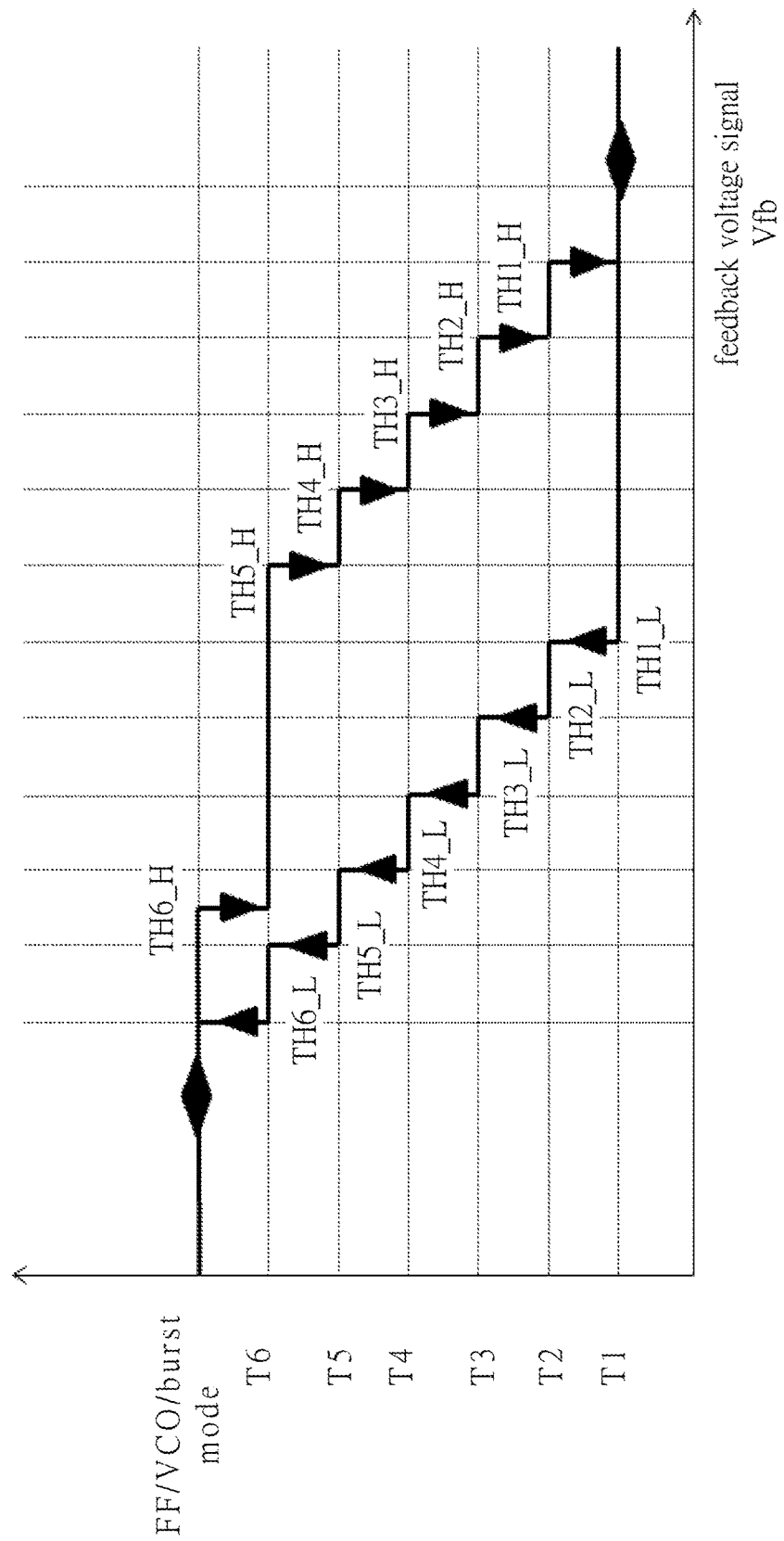
FIG. 5 is a diagram illustrating the relationship between a feedback voltage signal and a turn on time of an auxiliary switch of an active clamp circuit of the converter according to some embodiments of the present disclosure.

Reference is made to FIG. 5. FIG. 5 is a diagram illustrating the relationship between the feedback voltage signal Vfb and the turn on moment of the auxiliary switch Sa according to some embodiments of the present disclosure. As shown in FIG. 5, the feedback voltage signal Vfb may be used to indicate the load condition of the converter 100.

When the converter is at a heavy load condition, the control circuit 150 of the converter 100 is configured to control the auxiliary switch Sa to be turned on when the voltage Vds1 across the main switch Sm is at the moment T1 when the resonant voltage is at the first peak.

As shown in the figure, when the load of the converter 100 is gradually reduced such that the feedback voltage signal Vfb is lower than the threshold value TH1_L, the control circuit 150 controls the turn on moment of the auxiliary switch Sa to shift from the moment T1 when the resonant voltage is at the first peak to the moment T2 when the resonant voltage is at the second peak. Similarly, when the feedback voltage signal Vfb is lower than the threshold value TH2_L, the control circuit 150 controls the turn on moment of the auxiliary switch Sa to shift from the second peak of the resonant voltage T2 to the third peak of the resonant voltage T3, and so on.

Accordingly, when the converter 100 is at a medium load condition, the control circuit 150 may be configured to control the auxiliary switch Sa to be turned on when the voltage Vds1 across the main switch Sm is at one of the 2nd to Nth peaks of the resonant voltage, in which N is an integer.

In addition, when the feedback voltage signal Vfb is lower than the threshold value TH6_L, the converter 100 is at a light load condition. At this time, the control circuit 150 is configured to output the auxiliary switch control signal CTa to control the converter 100 to be operated in a fixed frequency mode (FF mode) or a voltage control oscillating mode (VCO mode) or a burst mode.

Similarly, the load of the converter 100 may be increased from the light load to the heavy load. When the converter is at a light load condition, the control circuit 150 may control the converter 100 to be operated in the fixed frequency mode or the VCO mode or the burst mode. When the converter is at a medium load condition, the control circuit 150 may control the auxiliary switch Sa to be turned on when the voltage Vds1 across the main switch Sm is at one of the 2nd to Nth peak of the resonant voltage. When the converter is at a heavy condition, the control circuit 150 may control the auxiliary switch Sa to be turned on at the moment T1 when the voltage Vds1 across the main switch Sm is at the first peak of the resonant voltage.

As shown in the figure, when the load of the converter 100 is gradually increased such that the feedback voltage signal Vfb is higher than the threshold value TH6_H, the control circuit 150 controls the converter 100 to exit from the fixed frequency mode or the VCO mode or the burst mode, and controls the turn-on moment of the auxiliary switch Sa to the moment T6 when the resonant voltage is at the sixth peak. Similarly, when the feedback voltage signal Vfb is higher than the threshold value TH5_H, the control circuit 150 controls the turn-on moment of the auxiliary switch Sa to shift from the moment T6 when the resonant voltage is at the sixth peak to the moment T5 when the resonant voltage is at the fifth peak. When the feedback voltage signal Vfb is higher than the threshold value TH4_H, the control circuit 150 controls the turn-on moment of the auxiliary switch Sa to shift from the moment T5 when the resonant voltage is at the fifth peak to the moment T4 when the resonant voltage is at the fourth, and so on.

Finally, when the feedback voltage signal Vfb is higher than the threshold value TH1_H, the control circuit 150 controls the turn-on moment of the auxiliary switch Sa to shift from the moment T2 when the resonant voltage is at the second peak to the moment T1 when the resonant voltage is at the first peak.

It is noted that, as illustrated in FIG. 5, different threshold values TH1_L-TH6_L and TH1_H-TH6_H may be chosen to execute the switching when the load is reduced from the heavy load to the light load, and when the load is increased from the light load to the heavy load. For example, threshold values TH1_L-TH6_L may be chosen to execute the switching when the load is reduced from the heavy load to the light load. On the other hand, threshold values TH1_H-TH6_H may be chosen to execute the switching when the load is increased from the light load to the heavy load, and the specific values of the threshold values TH1_H-TH6_H may also be adjusted according to actual design requirements.

In addition, the elements in the above embodiments may be implemented by various digital or analog circuits, and may also be implemented by different integrated circuit chips. Each element may also be integrated in a single digital control chip. The control circuit 150 may also be realized by various processors or other integrated circuit chips. The above list is merely exemplary and is not meant to be limitations of the present disclosure.

Figure 6:
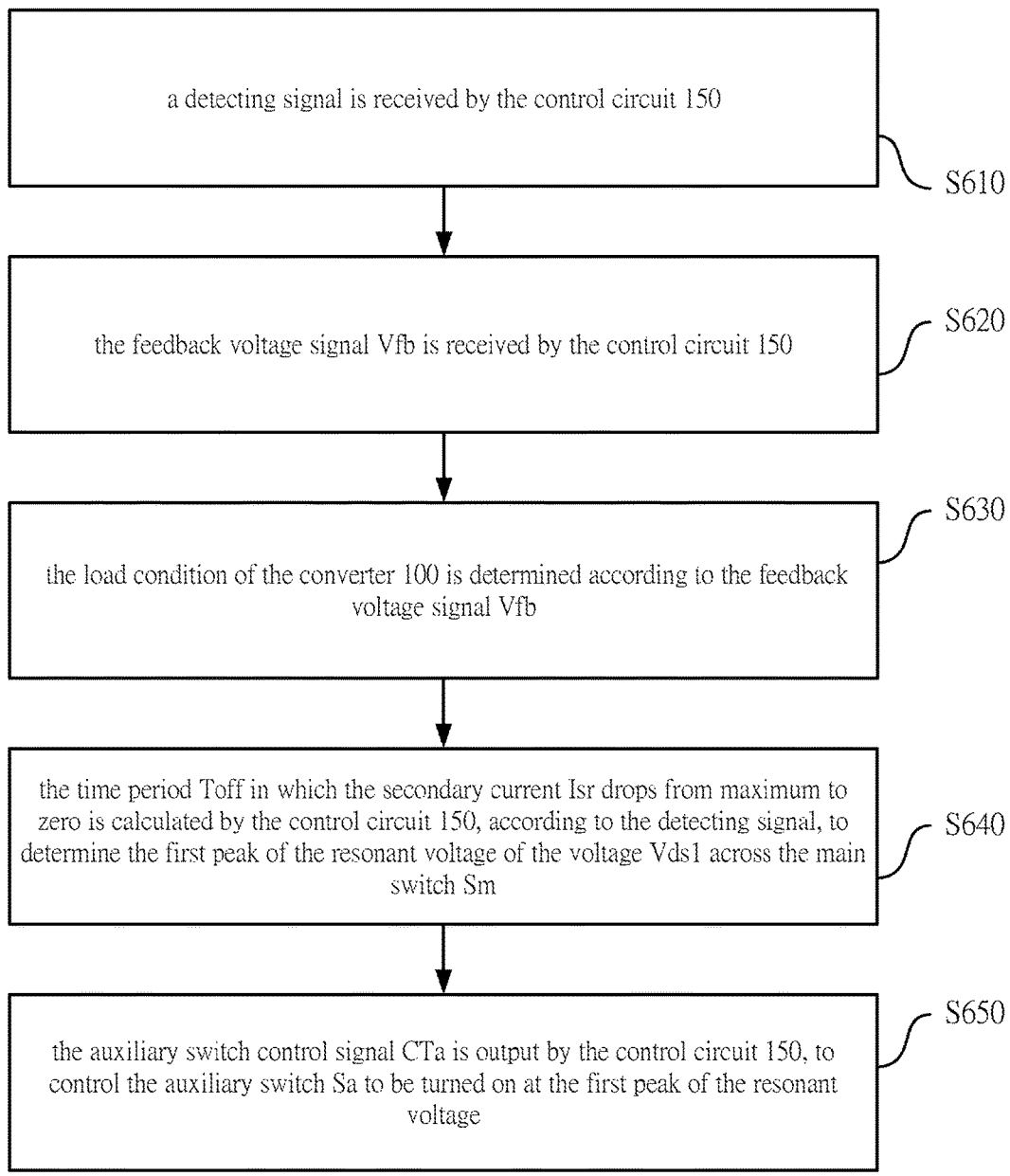
FIG. 6 is a flowchart illustrating a control method according to some embodiments of the present disclosure.

Reference is made to FIG. 6. FIG. 6 is a flowchart illustrating a control method 600 according to some embodiments of the present disclosure. For better understanding of the present disclosure, the control method 600 is discussed in relation to the embodiments shown in FIGS. 1-5, but is not limited thereto. It will be apparent to those skilled in the art that various modifications and variations can be made without departing from the scope or spirit of the disclosure. As shown in FIG. 6, the control method 600 includes steps S610, S620, S630, S640 and S650.

First, in the step S610, a detecting signal is received by the control circuit 150. For example, in some embodiments, the detecting signal includes the input voltage Vin and the voltage value Vaux_1 of the auxiliary winding during the time period Toff. In some other embodiments, the detecting signal includes the peak value Ipk of the primary current and the voltage value Vaux_1 of the auxiliary winding during the time period Toff. Alternatively stated, the detecting signal includes a first signal and a second signal.

For example, in some embodiments, the converter 100 includes resistors R1, R2 and resistors R3, R4, in which the resistors R1 and R2 are electrically coupled at the first node, and coupled in series to each other between the positive terminal and the negative terminal of the input voltage Vin. The resistors R3 and R4 are electrically coupled at the second node, and coupled in series to each other between the first terminal and the second terminal of the auxiliary winding. The step S610 further includes receiving a first signal (e.g., the input voltage Vin) according to the voltage value of the first node electrically connected by the resistors R1 and R2, and receiving the second signal by the control circuit 150 according to the auxiliary winding voltage Vaux. Specifically, the second signal (e.g., the auxiliary winding voltage Vaux) is received by the control circuit 150 according to the voltage value of the second node electrically connected by the resistors R3 and R4.

Next, in the step S620, the feedback voltage signal Vfb is received by the control circuit 150.

Next, in the step S630, the load condition of the converter 100 is determined according to the feedback voltage signal Vfb.

Next, in the steps S640 and S650, when the converter 100 is at a heavy load condition, the auxiliary switch control signal CTa is output by the control circuit 150 according to the time period Toff, to control the auxiliary switch Sa to be turned on when the voltage Vds1 across the main switch Sm is at the first peak of the resonant voltage.

Specifically, in the step S640, the time period Toff in which the secondary current Isr drops from maximum to zero is calculated by the control circuit 150, according to the detecting signal, to detect the first peak of the resonant voltage of the voltage Vds1 across the main switch Sm.

Next, in the step S650, the auxiliary switch control signal CTa is output by the control circuit 150, to control the auxiliary switch Sa to be turned on at the first peak of the resonant voltage.

It is noted that, in some embodiments, the control method 600 further includes when the converter 100 is at a medium load condition, outputting the auxiliary switch control signal CTa by the control circuit 150, to control the auxiliary switch Sa to be turned on when the voltage Vds1 across the main switch Sm is at one of the 2nd to Nth peaks of the resonant voltage, in which N is an integer. In some embodiments, the control method 600 further includes when the converter 100 is at a light load condition, outputting the auxiliary switch control signal CTa by the control circuit 150, to control the converter 100 to be operated in the fixed frequency mode or the VCO mode or the burst mode.

Specifically, in some embodiments, when the feedback voltage signal Vfb is larger than the first threshold value (e.g., the threshold value TH1_L in FIG. 5), the control circuit 150 controls the auxiliary switch Sa to be turned on when the voltage Vds1 across the main switch Sm is at the first peak of the resonant voltage. When the feedback voltage signal Vfb is between the first threshold value (e.g., the threshold value TH1_L in FIG. 5) and a light load threshold value (e.g., the threshold value TH6_L in FIG. 5), the control circuit 150 controls the auxiliary switch Sa to be turned on when the voltage Vds1 across the main switch Sm is at one of the 2nd to Nth peaks of the resonant voltage. Similarly, when the feedback voltage signal Vfb is smaller than the light load threshold value (e.g., the threshold value TH6_L in FIG. 5), the control circuit 150 outputs the auxiliary switch control signal CTa, to control the converter 100 to be operated in the fixed frequency mode or the VCO mode or a burst mode.

For example, in some embodiments, when the load of the converter 100 is gradually reduced, controlling the auxiliary switch Sa to be turned on when the voltage Vds1 across the main switch Sm is at one of the 2nd to Nth peaks of the resonant voltage includes: when the feedback voltage signal Vfb is between the (P-1)th threshold value (e.g., the threshold value TH1_L, TH2_L, TH3_L, TH4_L or TH5_L in FIG. 5) and the Pth threshold value (e.g., the threshold value TH2_L, TH3_L, TH4_L, TH5_L or TH6_L in FIG. 5), the control circuit 150 controls the auxiliary switch Sa to be turned on when the voltage Vds1 across the main switch Sm is at the Pth peak of the resonant voltage, in which P is an integer smaller than or equal to N. Specifically, when the converter 100 is at a medium load condition, the moment of the Pth peak of the resonant voltage of the voltage across the main switch Sm is detected by the control circuit 150 according to zero crossing points of the voltage Vaux across the auxiliary winding.

In some embodiments, the control method 600 further includes controlling, by the control circuit 150, the auxiliary switch Sa to be off before the secondary current Isr decreases to zero.

Those skilled in the art can immediately understand how to perform the operations and functions of the control method 600 based on the converter 100 in the various embodiments described above, and thus a further explanation is omitted herein for the sake of brevity.

While disclosed methods are illustrated and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

In summary, in various embodiments of the present disclosure, by detecting a corresponding voltage or current signal, the control circuit 150 may control the auxiliary switch Sa to be turned on at the first peak of the resonant voltage of the voltage waveform, so as to increase the conversion efficiency of the converter 100. In addition, by detecting a corresponding voltage or current signal, the control circuit 150 may control the auxiliary switch Sa to be turned on at the one of the 2nd to Nth peaks of the resonant voltage of the voltage waveform based on the load condition, so as to increase the overall conversion efficiency of the converter 100.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A converter, comprising:
   a transformer comprising a primary winding and a secondary winding, and configured to receive an input voltage and output an output voltage to a load;
   a main switch electrically coupled between the primary winding and a primary ground terminal;
   an active clamp circuit comprising an auxiliary switch and a clamp capacitor, wherein the auxiliary switch is coupled to the clamp capacitor in series, and the active clamp circuit is coupled in parallel to the two terminals of the primary winding or the two terminals of the main switch, and configured to clamp a voltage across the main switch when the main switch is off;
   a control circuit configured to output an auxiliary switch control signal to control the auxiliary switch to be turned on when the voltage across the main switch is at one of the 1st to Nth peaks of a resonant voltage oscillating during a current flowing through the secondary winding being zero, wherein N is an integer; and
   a detecting unit configured to detect at least one of a voltage signal and a current signal to obtain a detecting signal, wherein the control circuit further comprises a calculating unit, the calculating unit is configured to receive the detecting signal and calculate a period of time in which the secondary current drops from maximum zero;
   wherein the detecting signal comprises the input voltage and an auxiliary winding voltage, and the calculating unit is configured to calculate the period of time in which the secondary current drops from maximum to zero according to a turn ratio between the primary winding and the secondary winding of the transformer, a turn ratio between the secondary winding and the auxiliary winding of the transformer, the input voltage, the voltage value of the auxiliary winding during the period of time in which the secondary current drops from maximum to zero, and a conducting time of the main switch, and configured to output the auxiliary switch control signal according to the period of time in which the secondary current drops from maximum to zero, to control the auxiliary switch to be turned on when the voltage across the main switch is at the first peak of the resonant voltage;

wherein the calculating unit comprises a first pin, a second pin, a third pin, and a first current source, wherein the first pin is configured to receive an input voltage signal output by the detecting unit, and the second pin is configured to receive the voltage value of the auxiliary winding during the period of time in which the secondary current drops from maximum to zero output by the detecting unit, the third pin is connected to a first resistor and the first current source, the calculating unit calculates the period of time in which the secondary current drops from maximum to zero according to the value of the first pin, of the second pin, of the third pin, and the conducting time of the main switch.

2. The converter of claim 1, wherein the control circuit further configured to control the auxiliary switch to be off before a secondary current decreases to zero.

3. The converter of claim 1, wherein when the converter is at a heavy load condition, the control circuit is configured to control the auxiliary switch to be turned on when the voltage across the main switch is at the first peak of the resonant voltage.

4. The converter of claim 3, further comprising a secondary rectifier unit electrically connected to the secondary winding, wherein a secondary current flows through the secondary rectifier unit when the secondary rectifier unit is on, and the voltage across the main switch is at the first peak of the resonant voltage when the secondary current decreases to zero.

5. The converter of claim 4, wherein the control circuit is configured to control the auxiliary switch to be turned on at a moment of delaying for a period of time in which the secondary current drops from maximum to zero after the main switch being turned off.

6. The converter of claim 1, wherein when the converter is at a medium load condition, the control circuit is configured to control the auxiliary switch to be turned on when the voltage across the main switch is at one of the 2nd to Nth peaks of the resonant voltage, wherein N is an integer.

7. The converter of claim 6, wherein the converter further comprises an auxiliary winding, and the control circuit is configured to detect the zero-crossing points of the voltage across the auxiliary winding shifted from negative to positive, calculate a moment delaying for a phase angle of 90degrees after the zero-crossing points and output the auxiliary switch control signal correspondingly, to control the auxiliary switch to be turned on when the voltage across the main switch is at one of the 2nd to Nth peaks of the resonant voltage.

8. The converter of claim 1, wherein when the converter is at a light load condition, the control circuit is configured to output the auxiliary switch control signal to control the converter to be operated in a fixed frequency mode or a voltage control oscillating mode or a burst mode.

9. A control method for a converter, comprising:
receiving, by a control circuit, a detecting signal;
calculating, by the control circuit, a period of time in which a secondary current drops from maximum to zero according to the detecting signal, to determine a moment of a first peak of a resonant voltage of a voltage across a main switch; and
outputting, by the control circuit, an auxiliary switch control signal to control an auxiliary switch to be turned on when the voltage across the main switch is at one of the 1st to Nth peaks of the resonant voltage oscillating during a current flowing through the secondary winding being zero, wherein N is an integer;
the control method further comprising:
receiving, by the control circuit, a feedback voltage signal;
determine a load condition of the converter according to the feedback voltage signal;
when the converter is at a heavy load condition, controlling, by the control circuit, the auxiliary switch to be turned on when the voltage across the main switch is at the first peak of the resonant voltage; and
when the convertor is at a medium load condition, outputting the auxiliary switch control signal by the control circuit, to control the auxiliary switch to be turned on when the voltage across the main switch is at one of the 2nd to Nth peaks of the resonant voltage, wherein N is an integer.

10. The control method of claim 9, further comprising:
controlling, by the control circuit, the auxiliary switch to be off before a secondary current decreases to zero.

11. The control method of claim 9, further comprising:
when the converter is at a light load condition, outputting the auxiliary switch control signal by the control circuit, to control the converter to be operated in a fixed frequency mode or a voltage control oscillating mode or a burst mode.

12. The control method of claim 9, further comprising:
when the feedback voltage signal is larger than a first threshold value, controlling, by the control circuit, the auxiliary switch to be turned on when the voltage across the main switch is at the first peak of the resonant voltage; and
when the feedback voltage signal is between the first threshold value and a light load threshold value, controlling, by the control circuit, the auxiliary switch to be turned on when the voltage across the main switch is at one of the 2nd to Nth peaks of the resonant voltage.

13. The control method of claim 12, wherein controlling the auxiliary switch to be turned on when the voltage across the main switch is at one of the 2nd to Nth peaks of the resonant voltage comprises:
when the feedback voltage signal is between a (P-1)th threshold value and the Pth threshold value, controlling, by the control circuit, the auxiliary switch to be turned on when the voltage across the main switch is at the Pth peak of the resonant voltage, wherein P is an integer smaller than or equal to N.

14. The control method of claim 12, further comprising:
when the feedback voltage signal is smaller than the light load threshold value, outputting the auxiliary switch control signal by the control circuit, to control the converter to be operated in a fixed frequency mode or a voltage control oscillating mode or a burst mode.

15. The control method of claim 9, wherein the transformer comprises an auxiliary winding, and the control method further comprises:
when the converter is at a medium load condition, detecting, by the control circuit, the moment of the peaks of the resonant voltage of the voltage across the main switch according to zero crossing points of the voltage across the auxiliary winding.

16. A converter, comprising:
a transformer comprising a primary winding and a secondary winding, and configured to receive an input voltage and output an output voltage to a load;

a main switch electrically coupled between the primary winding and a primary ground terminal;

an active clamp circuit comprising an auxiliary switch and a clamp capacitor, wherein the auxiliary switch is coupled to the clamp capacitor in series, and the active clamp circuit is coupled in parallel to the two terminals of the primary winding or the two terminals of the main switch, and configured to clamp a voltage across the main switch when the main switch is off;

a control circuit configured to output an auxiliary switch control signal to control the auxiliary switch to be turned on when the voltage across the main switch is at one of the 1st to Nth peaks of a resonant voltage oscillating during a current flowing through the secondary winding being zero, wherein N is an integer; and a detecting unit configured to detect at least one of a voltage signal and a current signal to obtain a detecting signal, wherein the control circuit further comprises a calculating unit, the calculating unit is configured to receive the detecting signal and calculate a period of time in which the secondary current drops from maximum to zero;

wherein the detecting signal comprises a primary current peak value and a voltage value of an auxiliary winding during the period of time in which the secondary current drops from maximum to zero, and the calculating unit is configured to calculate the period of time in which the secondary current drops from maximum to zero according to a turn ratio between the primary winding and the secondary winding of the transformer, a turn ratio between the secondary winding and the auxiliary winding of the transformer, the primary current peak value, the voltage value of the auxiliary winding during the period of time in which the secondary current drops from maximum to zero, and a magnetizing inductance, and configured to output the auxiliary switch control signal according to the period of time in which the secondary current drops from maximum to zero, to control the auxiliary switch to be turned on when the voltage across the main switch is at the first peak of the resonant voltage;

wherein the calculating unit comprises a first pin, a second pin, a third pin, a fourth pin, a first current source and a second current source, wherein the first pin is configured to receive the primary current peak value output by the detecting unit, and the second pin is configured to receive the voltage value of the auxiliary winding during the period of time in which the secondary current drops from maximum to zero output by the detecting unit, the third pin is connected to a first resistor and the first current source, the fourth pin is connected to a second resistor and the second current source, the calculating unit calculates the period of time in which the secondary current drops from maximum to zero according to the value of the first pin, of the second pin, of the third pin, and of the fourth pin.

* * * * *